United States Patent
Mitchelson (10) Patent No.: US 8,033,976 B2
(45) Date of Patent: Oct. 11, 2011

US008033976B2

(54) APPARATUS AND METHOD FOR CENTRIFUGAL SEPARATION UTILIZING A MOVABLE COLLECTION ASSEMBLY

(75) Inventor: Keith Richard Mitchelson, St Lucia (AU)

(73) Assignees: CapitalBio Corporation, Beijing (CN); Keith Richard Mitchelson, St. Lucia, Queensland (AU)

( * ) Notice: Subject to any disclaimer, the term of this patent is extended or adjusted under 35 U.S.C. 154(b) by 1238 days.

(21) Appl. No.: 10/573,870

(22) PCT Filed: Sep. 30, 2004

(86) PCT No.: PCT/AU2004/001343
§ 371 (c)(1),
(2), (4) Date: Jan. 5, 2007

(87) PCT Pub. No.: WO2005/030361
PCT Pub. Date: Apr. 7, 2005

(65) Prior Publication Data
US 2007/0199907 A1    Aug. 30, 2007

(30) Foreign Application Priority Data
Sep. 30, 2003  (AU) ................... 2003905322

(51) Int. Cl.
*B04B 11/08* (2006.01)
(52) U.S. Cl. ............. 494/1; 494/10; 494/27; 494/37; 494/57
(58) Field of Classification Search ............ 494/1–6, 494/37, 27–30, 56, 57, 60, 80, 10
See application file for complete search history.

(56) References Cited

U.S. PATENT DOCUMENTS

| | | | |
|---|---|---|---|
| 2,106,964 A * | 2/1938 | Wells | 208/33 |
| 2,154,134 A | 4/1939 | Hill | |
| 3,243,106 A | 3/1966 | Edward et al. | |
| 3,428,249 A | 2/1969 | Wheelock et al. | |
| 3,570,754 A * | 3/1971 | Kirkpatrick | 494/7 |

(Continued)

FOREIGN PATENT DOCUMENTS
EP    0 654 669    2/2002
(Continued)

OTHER PUBLICATIONS

International Search Report for PCT/AU2004/001343, mailed on Nov. 5, 2004, 4 pages.

(Continued)

*Primary Examiner* — Charles E Cooley
(74) *Attorney, Agent, or Firm* — Morrison & Foerster LLP (57) ABSTRACT

The invention provides an apparatus for separating a multiphase mixture into discrete density phases, comprising a circular bowl rotatable about a central axis and having an opening through which the mixture is introduced into the bowl, whereby the rotation of the bowl separates the mixture to form annular columns of the discrete density phases; a delivery conduit inserted into the bowl through the opening for introducing the mixture into the bowl; and a collection assembly for removing the separated discrete density phases, comprising a collection conduit for collecting the annular columns, a waste collecting conduit, and a cleaning conduit. The collection assembly is movable as a single unit with respect to the bowl such that it can be positioned within the bowl to sequentially, selectively and individually remove the annular columns from the bowl while the bowl is rotating substantially without disturbing the remaining annular columns within the bowl.

20 Claims, 8 Drawing Sheets

U.S. PATENT DOCUMENTS

| | | | | |
|---|---|---|---|---|
| 3,595,470 A | * | 7/1971 | Shapiro | 494/5 |
| 3,703,983 A | * | 11/1972 | Tholl | 494/8 |
| 3,718,278 A | * | 2/1973 | Conklin | 494/2 |
| 3,779,450 A | * | 12/1973 | Shapiro | 494/51 |
| 3,981,804 A | | 9/1976 | Gigliello | |
| 4,007,871 A | | 2/1977 | Jones et al. | |
| 4,543,085 A | * | 9/1985 | Funabashi et al. | 494/30 |
| 4,591,445 A | | 5/1986 | Spinell et al. | |
| 4,900,453 A | * | 2/1990 | Sedlmayer | 210/742 |
| 5,090,953 A | * | 2/1992 | Buttner et al. | 494/1 |
| 5,591,340 A | | 1/1997 | Meikrantz et al. | |
| 5,610,074 A | * | 3/1997 | Beritashvili et al. | 436/177 |
| 2007/0199907 A1 | * | 8/2007 | Mitchelson | 210/782 |

FOREIGN PATENT DOCUMENTS

| | | |
|---|---|---|
| EP | 1 014 088 | 3/2006 |
| JP | 2005-21852 * | 1/2005 |
| WO | WO-92/18216 | 10/1992 |
| WO | WO-93/25294 | 12/1993 |
| WO | WO-96/07097 | 3/1996 |

OTHER PUBLICATIONS

Supplementary European Search Report for EP 04761378.1, mailed Dec. 30, 2008, 3 pages.

* cited by examiner

APPARATUS AND METHOD FOR CENTRIFUGAL SEPARATION UTILIZING A MOVABLE COLLECTION ASSEMBLY

CROSS-REFERENCE TO RELATED APPLICATIONS

This application is the national phase of PCT application PCT/AU2004/001343 having an international filing, date of Sep. 30, 2004, which claims priority from Australian application number 2003905322 filed Sep. 30, 2003. The contents of these applications are incorporated herein by reference in their entireties.

FIELD OF THE INVENTION

The present invention relates to apparatus and methods for separating and partitioning phases of differing densities in multiphase mixtures.

BACKGROUND

Multiphase mixtures are generally separated into discrete phases of different density components by using centrifugal separators.

Centrifugal separators generally include a rotor encased in a housing. Attached to the rotor is a number of holders in which a number of small containers, such as test tubes, can be placed. The rotor is rotated and the multiphase mixture in the containers is separated into the separate media of the mixture. Once the rotor stops, the separated media is then able to be removed from each container either by hand or by a robotic arm. This separator processes a large number of small samples in one batch. A problem with this type of separator is the containers on the rotor must be arranged to balance the weight distribution around the rotor prior to the rotation so that the equipment is not damaged by an unbalanced loading.

Another centrifugal separator uses a single rotatable bowl to separate a single sample of the multiphase mixture. However, a problem with this type of separator is that remixing of the separated phases of the multiphase mixture after the rotor has ceased rotating can occur before the separated phases can be collected.

Another centrifugal separator uses a continuous feed of multiphase mixture into a rotating section so that the mixture can be separated into its discrete media. Generally shape of the rotating section is such that the media with higher density is directed to stationary collection points where it is collected. However this continuous action only allows for a large sample of the mixture with known density media to be separated and is unsuitable for samples with unknown phase amounts or densities.

There is therefore a need for a centrifugal separator that continuously processes a number of samples with unknown phase amounts or phase densities in a timely fashion.

STATEMENT OF INVENTION

Accordingly in one aspect, the present invention is an apparatus for separating a multiphase mixture, separable into discrete density phases, including:
a circular bowl rotatable about a central axis and having an opening through which the mixture is introduced into the bowl, whereby the rotation of the bowl separates the mixture to form annular rings of the discrete density phases, and
a collection assembly for removing the separated discrete density phases,
wherein the collection assembly is movable with respect to the bowl such that the collection assembly can be positioned in the bowl to sequentially selectively and individually remove the annular columns from the bowl while the bowl is rotating substantially without disturbing the remaining annular columns within the bowl.

The apparatus according to this invention is able to form discrete well defined phases in a timely manner. The need for sample balancing and those problems associated with loading and unloading sample containers are eliminated. The apparatus is also amenable to batches of any reasonable amount and is flexible to the proportions and relative densities of the mixture to be separated.

Preferably the apparatus is able to be automatically cleaned between samples so that an automatic and continuous process of separation can occur without cross contamination of the samples.

According to another aspect the present invention is a method of separating a multiphase mixture separable into discrete density phases, including the steps of:
introducing the mixture into a circular bowl, the bowl having an opening and a central axis of rotation,
rotating the bowl about the central axis of the bowl such that the mixture is separated into annular columns formed by the discrete density phases, and
removing the discrete density phases from the bowl by a collection assembly
wherein the collection assembly is movable with respect to the bowl such that the collection assembly can be positioned in the bowl to sequentially selectively and individually remove the annular columns from the bowl while the bowl is rotating substantially without disturbing the remaining annular columns within the bowl.

The method according to the present invention is able to form discrete well defined phases in a timely manner. The need for sample balancing and those problems associated with loading and unloading sample containers are eliminated. The method is also amenable to batches of any reasonable amount and is flexible to the proportions and relative densities of the mixture to be separated.

Preferably the bowl is able to be automatically cleaned between samples so that an automatic and continuous process of separation can occur without cross contamination of the samples.

BRIEF DESCRIPTION OF THE DRAWINGS

FIG. 1. A-D is a set of drawings showing a centrifugal separator according to one embodiment of the invention prior to the addition of a multiphase mixture.

FIGS. 2A-D is a set of drawings showing a centrifugal separator as shown in FIG. 1 after separation of the multiphase mixture and removing a portion of the separated mixture from the separator to waste.

FIGS. 3A-D is a set of drawings showing a centrifugal separator as shown in FIG. 1 after separation of the multiphase mixture and removing a portion of the separated mixture from the separator for further processing.

FIGS. 4A-D is a set of drawings showing a centrifugal separator as shown in FIG. 1 after removal of all components of the separated mixture from the separator and delivering a cleaning solution to the separator.

FIGS. 5A-D is a set of drawings showing a centrifugal separator as shown in FIG. 1 removing the cleaning solution from the separator to waste.

DETAILED DESCRIPTION

Certain embodiments of the invention will now be described by way of example only with reference to the accompanying drawings and examples.

Referring to FIGS. 1 to 5, the centrifugal separator 1 has a circular bowl 2, a delivery conduit 3, and a collection assembly 4. The delivery conduit 3 delivers the multiphase solution to the bowl 2 in order that the multiphase mixture can be separated into its discrete density phases by rotating the bowl 2 around its central axis. The separated phases form annular columns in the rotating bowl 2. The bowl 2 is open topped and is of a shape that allows the boundary layer between the separated different density phases of the multiphase mixture to be accentuated. The shape of the bowl 2 also allows the removal of all of the separated multiphase mixture by movement of the collection assembly 4. The collection assembly 4 includes a collection conduit 5, a waste collecting conduit 6, and a cleaning solution conduit 7.

Figures 3A, 3B:
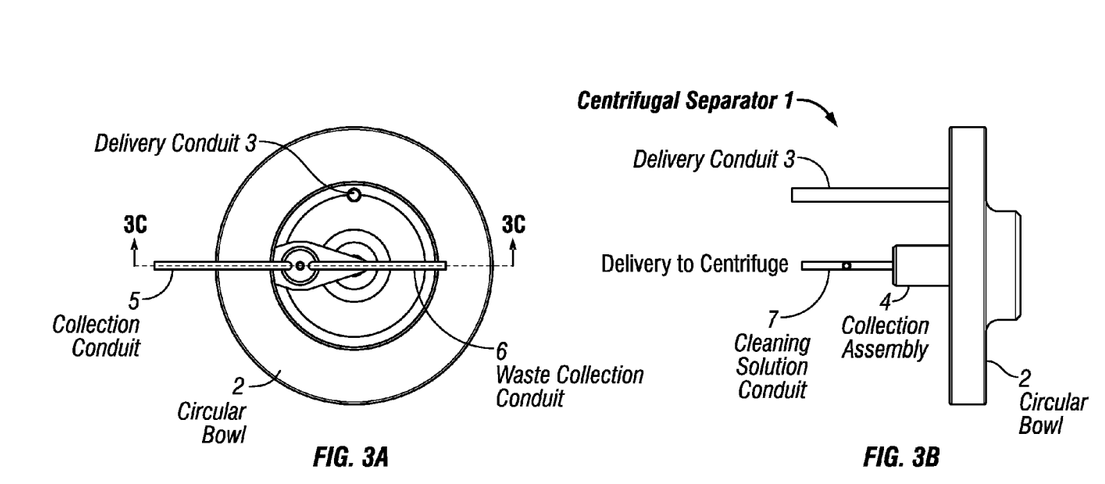
Figure 3C:
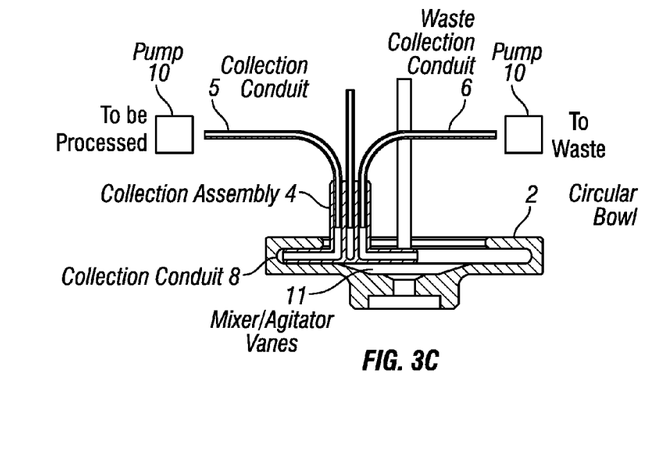
FIG. 3C is a sectional view taken along line 3C-3C in FIG. 3A.
Figure 3D:
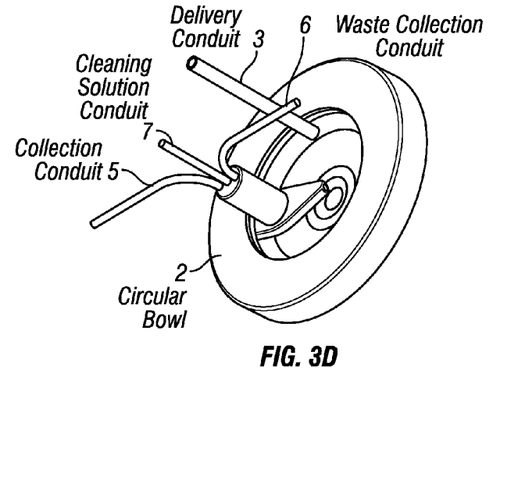
Figure 4A:
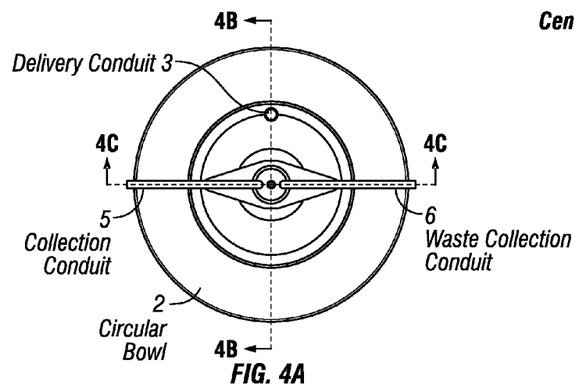
Figure 4B:
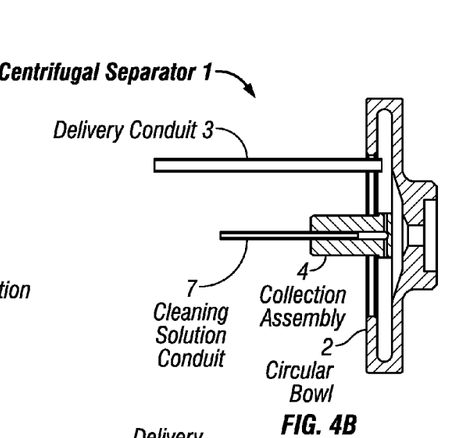
FIG. 4B is a sectional view taken along line 4B-4B in FIG. 4A.
Figure 4C:
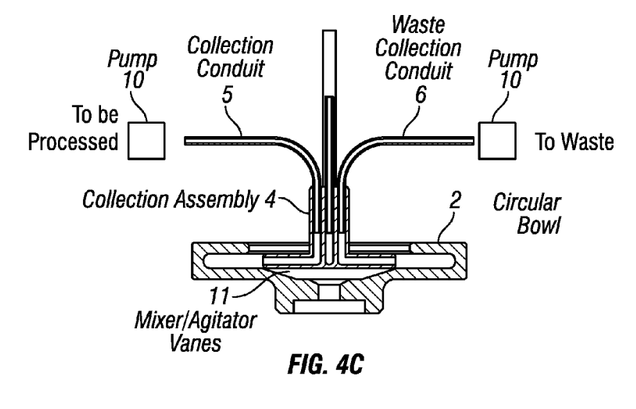
FIG. 4C is a sectional view taken along line 4C-4C in FIG. 4A.
Figure 4D:
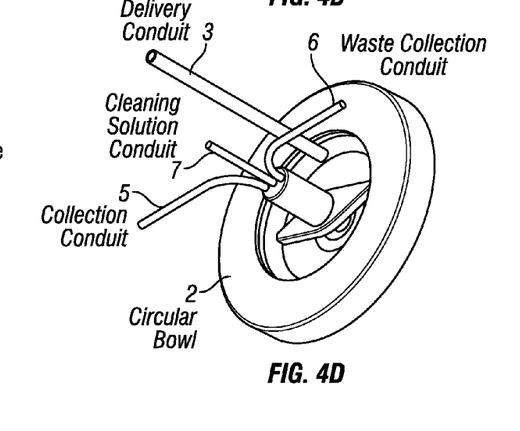

The collection conduit 5 is connected to a pump 10, which is able to either directly pump or create a reduced pressure such that the portion of the separated mixture which is to undergo further processing or analysis is able to be drawn into the collection conduit 5. The collection assembly 4 is moved by a movement control means 13 so that the end of the collection conduit 8 is able to collect that portion of the separated mixture whilst minimizing the disruption to the other portions of the separated mixture during rotation of the bowl 2. This can be achieved by moving the end of the collection conduit 8 so that it is proximal to but not touching the portion to be collected, as shown in FIG. 3.

Figure 2A:
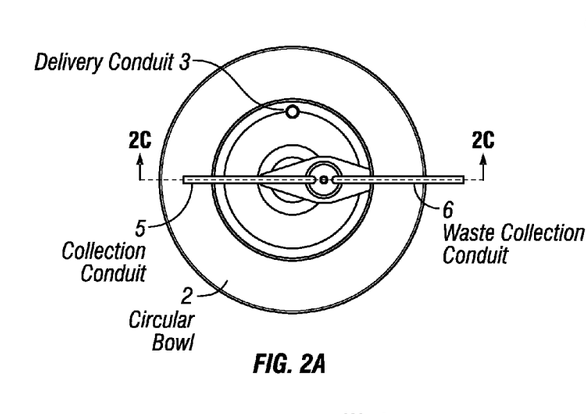
Figure 2B:
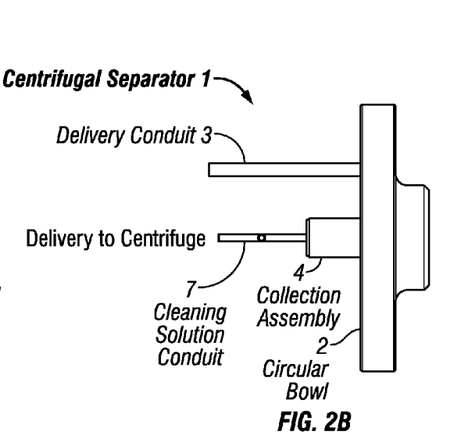
Figure 2C:
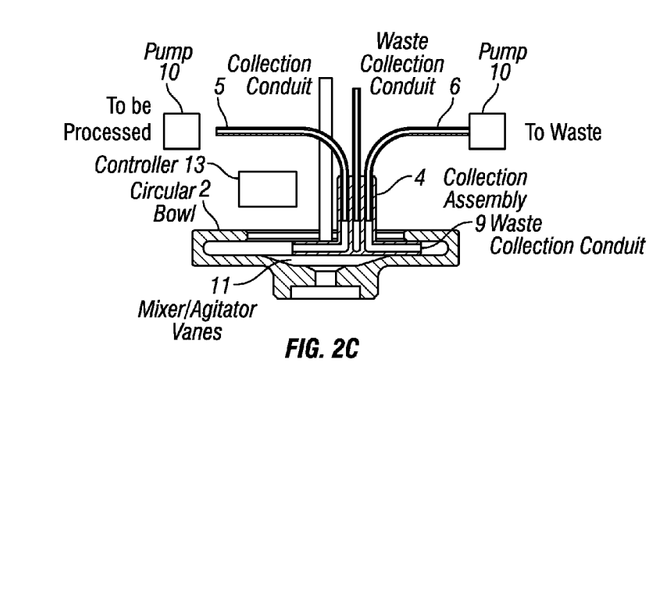
FIG. 2C is a sectional view taken along line 2C-2C in FIG. 2A.
Figure 2D:
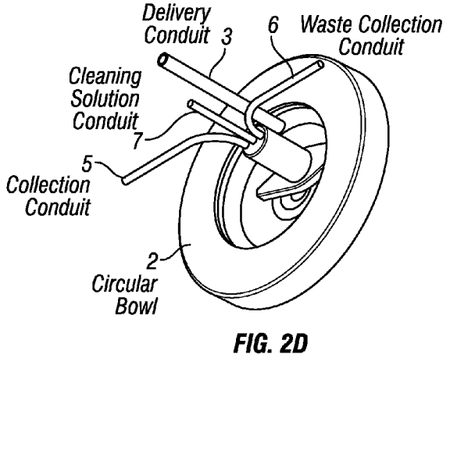

The waste collecting conduit 6 is also connected to a pump 10, which is able to either directly pump or create a reduced pressure such that the portion of the separated mixture which is to be discarded is able to be drawn into the waste collection conduit 6. The collection assembly 4 is moved by the movement control means 13 so that the end of the waste collection conduit 9 is able to collect that portion of the separated mixture whilst minimizing the disruption to the other portions of the separated mixture during rotation of the bowl 2. This can be achieved by moving the end of the waste collecting conduit so that it is proximal to but not touching the portion to be collected, as shown in FIG. 2.

Figure 5A:
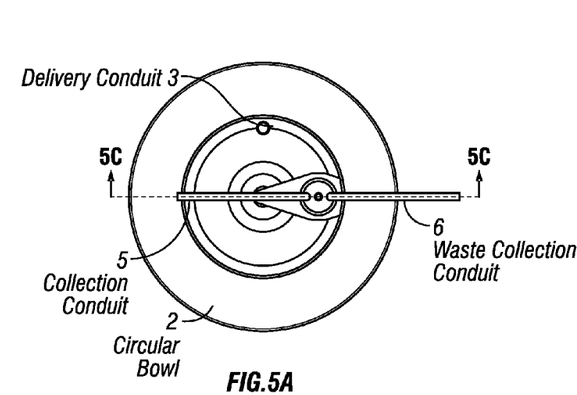
Figure 5B:
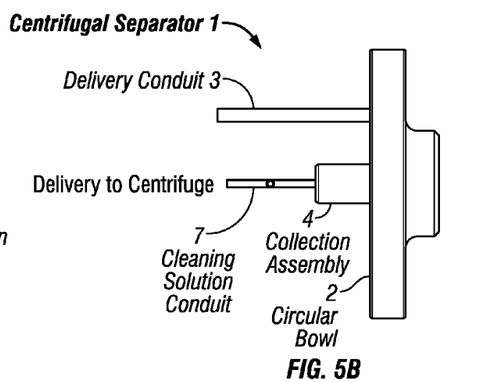
Figure 5C:
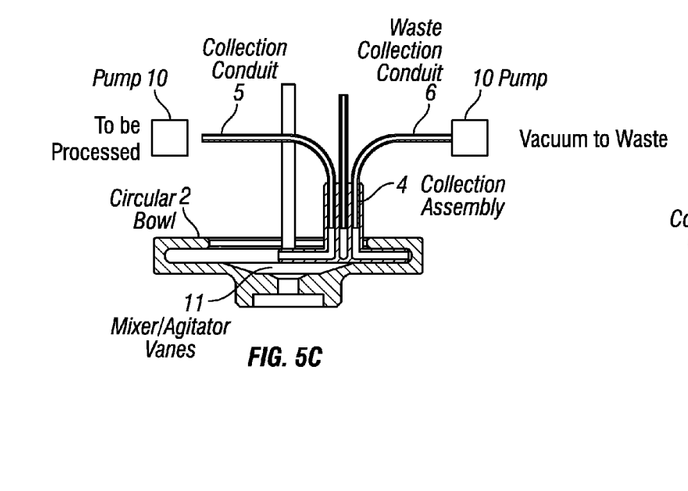
FIG. 5C is a sectional view taken along line 5C-5C in FIG. 5A.
Figure 5D:
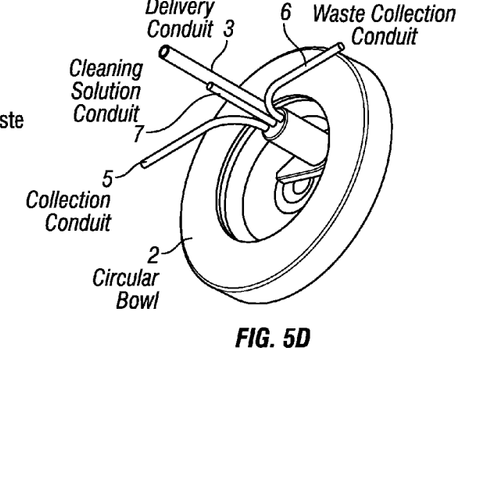

The cleaning solution conduit 7 is able to supply the bowl 2 with a cleaning solution in order for another multiphase mixture to be inserted into a clean bowl, as shown in FIG. 4. The cleaning solution is able to clean the bowl 2 to remove any residue and prevent cross contamination of samples. The cleaning solution is then able to be removed from the bowl by the waste collection conduit 6, as shown in FIG. 5.

A multiphase mixture is separated into discrete density phases by introducing the mixture into a circular bowl 2 through the delivery conduit 3, rotating the bowl 2 about its central axis such that the mixture is separated into at least two discrete density phases forming annular columns, and removing the discrete density phases from the bowl by the collection assembly 4. The collection assembly 4 is movable with respect to the bowl 4 such that the collection assembly 4 can be positioned within the bowl 2 to sequentially selectively and individually remove the annular columns in the bowl 2 while the bowl 2 is rotating substantially without disturbance of the remaining annular columns within the bowl 2.

The phase with the highest density forms the outer annular column furthest from the central axis of the bowl 2, while the phase with the least density forms the inner annular column closest to the central axis of the bowl 2. The collection assembly 4 is able to be moved so that the collection assembly 4 sequentially collects all of the separated phases, with the inner column being collected first, and the outer column being collected last. The rate of rotation can be reduced during the collection to that in which the separated discrete density phases will not remix.

The cleaning of the bowl 2 by a cleaning solution allows for batch processing of samples in a continuous process cycle without cross contamination. In a preferred configuration, an automated centrifugal separator includes a planar circular bowl for which a motorised automated collecting assembly, comprising collection conduits, pumps, valves, cleaning conduit and optical detection devices provide for the serial introduction of multiphase mixtures into a separation environment, automated collection of the resolved phase fractions from the rotating centrifugal separator, and cleaning of bowl between mixtures during continuous operation of the centrifugal separator.

Figure 6:
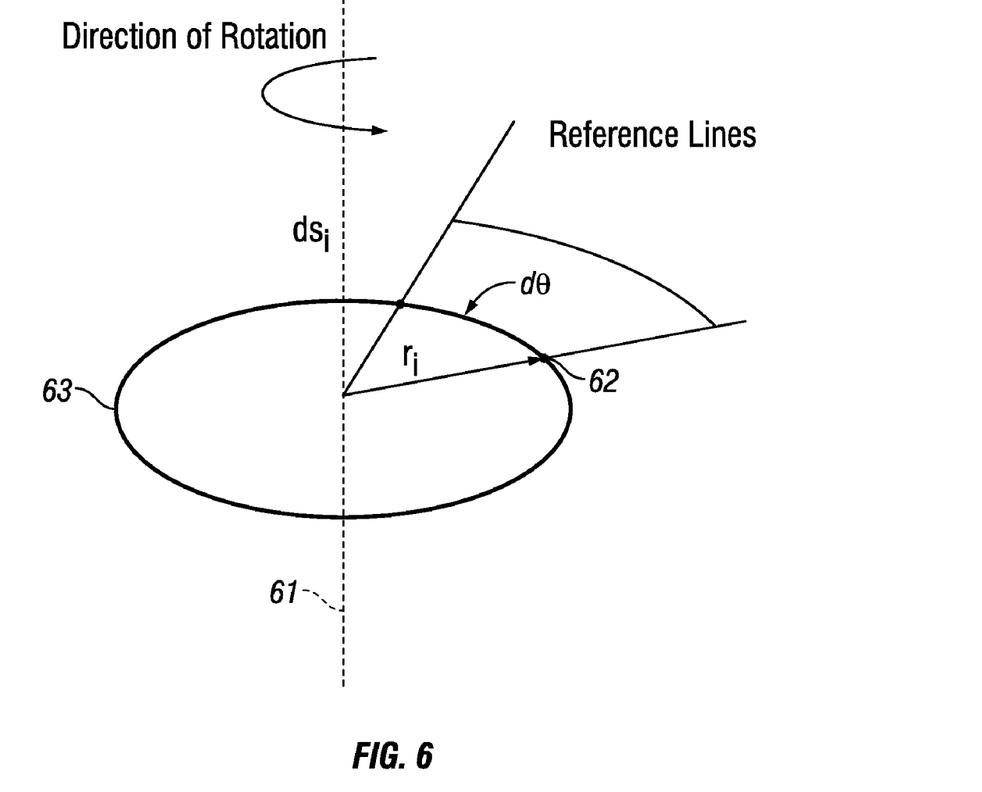
FIG. 6 is a schematic drawing of a particle undergoing rotation.

The current understanding of the forces exerted upon the sample at the liquid surface at the point of collection are a function of the centrifugal forces and frictional forces acting on particles in a rotating liquid are as follows:

1. Consider a particle at the surface of the rotating liquid column within the rotating bowl as depicted in FIG. 6 where 61 is the axis of rotation, 62 is the ith particle Pi at the surface of the rotating annular fluid column, and 63 is the path traversed by the particle Pi as the fluid column rotates. Let $r_i$ be the distance from the centre of the disk to the ith particle, and let $\theta_i$ be the angle through which the particle is moved. As the particle is moved through an angle (angular displacement) $d\theta$, the particle moves through a circular arc of length $ds_i = r_i |d\theta|$ 2. The time rate of change of angular velocity of a rotating object is called the angular acceleration $\alpha$, where: $\alpha = d^2\theta/dt^2 = d\omega/dt$ The angle $d\theta$ is the angular displacement, within a period of time dt and $\omega$ is the angular velocity vector parallel to the direction of rotation.

Figure 7:
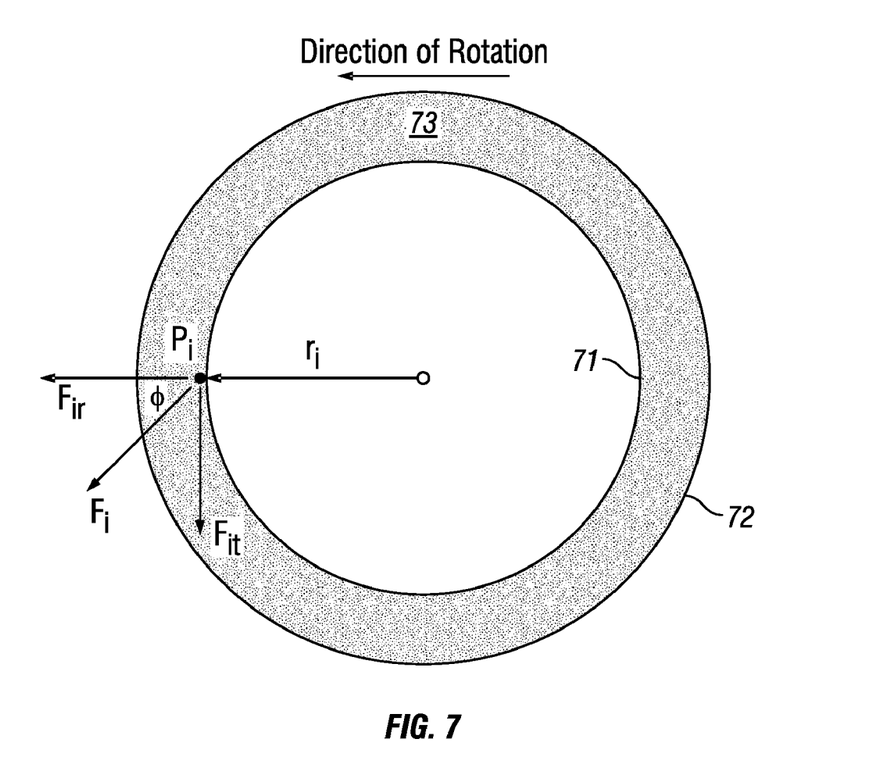
FIG. 7 is a schematic drawing of a particle in a ring of fluid undergoing rotation.

3. The linear velocity of a particle at the surface of the rotating liquid is tangential to the circular path of the particle and this velocity has magnitude: $v_{it} = ds_i/dt$ 4. The tangential velocity can be related to the angular velocity of the rotating body thus: $v_{it} = ds_i/dt = r_i d\omega/dt = r_i \omega$ 5. Similarly, the tangential acceleration of the particle on the surface of the rotating liquid column is: $\alpha_{it} = dv_{it}/dt = r_i d\omega/dt$ Thus: $\alpha_{it} = r_i \alpha$ 6. Consider a particle at the surface of the rotating liquid column within the rotating bowl as shown in FIG. 7, where 71 is the inner surface of the rotating annular fluid column 73 on which the ith particle Pi is located, and 72 is the (truncated) inner wall of the rotating bowl or a boundary layer between the inner column 73 and an outer column. Similarly, the net tangential force exerted on the particle is:

$F_{it} = m_i \alpha_{it} = m_i r_i \alpha$ where $m_i$ is the mass of the particle $P_i$.

Thus the tangential force exerted on the particle at the surface of rotating column of liquid is proportional to the radial distance of the particle from the axis of rotation and the tangential acceleration of that particle.

Figure 8:
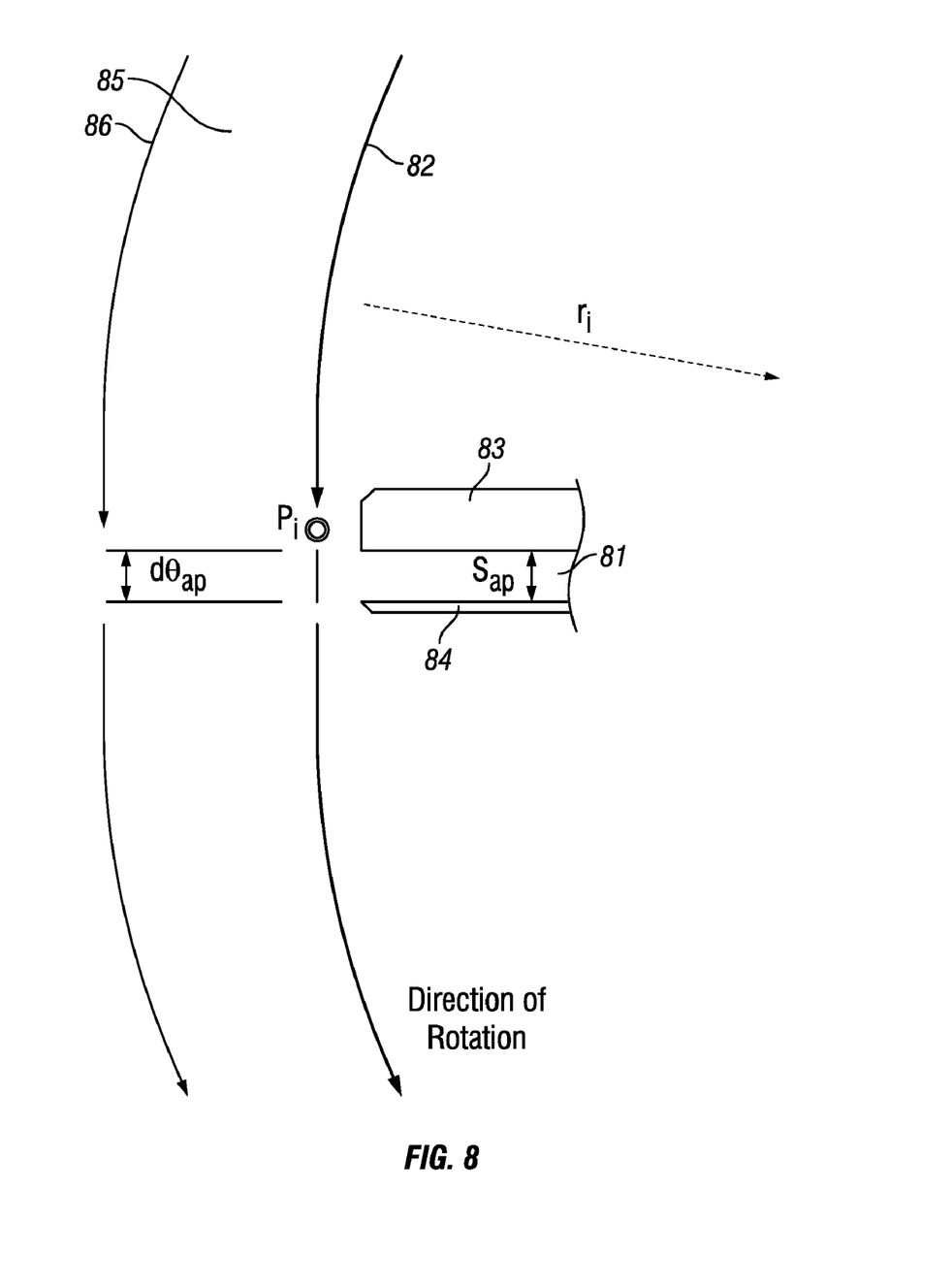
FIG. 8 is a schematic drawing of a particle in a ring of fluid undergoing rotation with a collection nozzle.

7. At constant angular velocity that force is zero, however when the particle is collected from the surface of the rotating annular column of liquid by the static collection conduit (static relative to the circular motion of the liquid column), the particle experiences a rapid deceleration and thus experiences a torque force which approximates to the tangential acceleration $F_{it} = m_i \alpha_{it} = m_i r_i \alpha$ The forces experienced by the particle can be resolved into two components, as shown in FIG. 7:

$F_{ir} = F_i \cos \phi$ along the radial line $r_i$ and $F_{it} = F_i \sin \phi$ perpendicular to the radial line 8. FIG. 8 shows the aperture of the collection conduit 81 positioned perpendicularly at the inner surface of a fluid column 82 of inner radius $r_i$, rotating within the bowl. The distal terminus of the collection conduit leading to the (truncated) proximal collection assembly 83. The inner tubular collection conduit 81 has a diameter of $s_{ap}$ within which distance particle $P_i$ is collected. The path distance $s_{ap}$ also approximates the path of circular arc through which particle $P_i$ is decelerated over the angle of rotation $d\theta_{ap}$ in time $dt_{ap}$. The collection conduit has an outer wall 84. The fluid bulk 85 resides in the annular rotating bowl proximal to the inner wall of the bowl 86, or a boundary layer between the inner column 85 and an outer column, whilst the collection assembly is located towards the axis of rotation of the bowl. Hence for particles collected by a collection assembly 83 held perpendicular to and immediately above the surface of the rotating liquid column 85 showing the direction of rotation of the rotor, deceleration of the particles occurs across the inner width of the collection conduit 81 as the particles are collected. The force applied to these particles thus approximates to the forces occurring during deceleration of the particle as it moves through a circular arc of approximate length $ds_{ap}$ which subtends an angle $d\theta_{ap}$, and which is equal to the width of the aperture of the collection conduit 81.

The magnitude of this force $F_{iap}$ will be affected by the time taken for the particle to move the displacement distance hence:

$$F_{iap} = m_{it} r_i \alpha_{ap} = m_{it} r_i (d^2\theta_{ap}/dt_{ap}^2)$$

9. Typically the flow rate of collection of sample from the inner surface of liquid is maintained at a rate equal to or greater than the rate at which an equivalent volume within the rotating liquid column 85 is presented for collection, ensuring that the end of the collection arm does not enter the surface of the liquid and is maintained outside the liquid surface as the arm moves uniformly and progressively towards the inner surface of the liquid 82. Microprocessor control of the speed of arm movement and collection pump speed maintains this balance.

10. Simultaneously, each particle at the surface of the column of liquid 85 also experiences a radial acceleration, the centripetal acceleration which points inward along the radial line, and has a magnitude:

$$\alpha_{ic} = (v_{it}^2/r_i = (r_i w)^2/r_i = r_i \omega^2$$

Thus particles at the liquid surface disturbed by collection processes are continuously subjected to centripetal acceleration and centripetal forces seeking to re-establish a uniform surface on the liquid column 85.

11. A particle collected from the surface must be subjected to a force exceeding $\alpha_{ic} = (v_{it})^2/r_i = r_i \omega^2$ by the collection assembly to retrieve the particle from the liquid surface by pump action.

12. For a collection conduit held at an angle less than perpendicular [subtending the angle $\phi$ from the perpendicular] to the surface of the rotating liquid column and facing against the direction of rotation, the forces will be a sum of $F_{iap}$ across the slanted collection aperture and a component of the vector $F_{it} \sin \phi$ perpendicular to the radial line. The force occurring during deceleration of these particles thus cannot exceed the maximum force $F_{it}$. The magnitude of this force $F_{i\ total}$ will also be affected by the time taken for the particle to move the displacement distance.

13. A proportion of the force vector $F_{it}$ sink perpendicular to the radial line also drives the collected liquid into the collection conduit for a collection conduit held at an angle less than perpendicular to the surface of the rotating liquid column and facing against the direction of rotation.

Figure 1A:
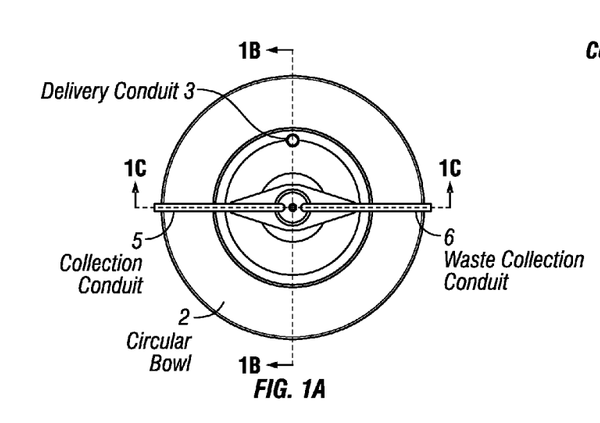
Figure 1B:
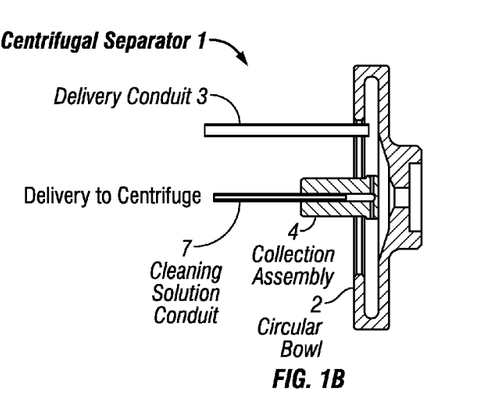
FIG. 1B is a sectional view taken along line 1B-1B in FIG. 1A.
Figure 1C:
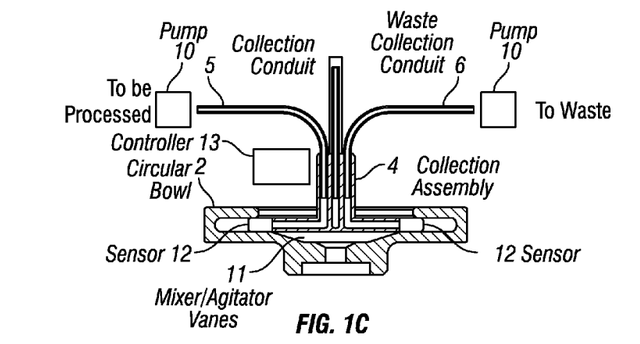
FIG. 1C is a sectional view taken along line 1C-1C in FIG. 1A.
Figure 1D:
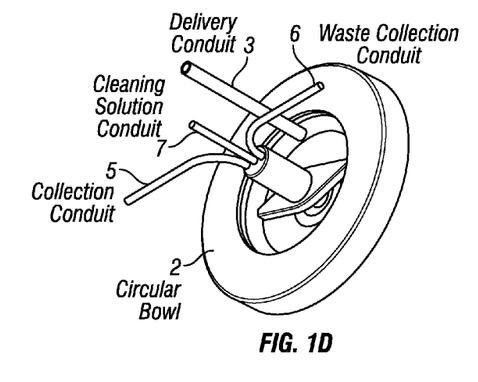

In one embodiment, the determination between the various components can be achieved by identifying the boundary layers of the components in the flow of separated mixture from the bowl. Sensing devices, such as devices that measure the optical density or light scattering, can be placed in the path of the collected solution and used to detect the different fractions of the phase solution. Data gained from this sensing actuates the appropriate processor controlled to determine whether the column should be collected for further processing or discarded to waste. The sensor may be positioned opposite the inlet collection conduit or waste collection conduit of the collection assembly (e.g., devices 12 in FIG. 1C). Alternatively, a sensor may be fixed and determine appropriate fluid fractions for collection and separation by analysis of scanned data.

In an alternative embodiment, the separate density media are identified in the bowl such that each media is identified as being a particular distance from the axis of rotation. The collection assembly is then able to move either the collection conduit or the waste collection conduit to be proximal with the inner column. The subsequent portions can then be collected sequentially from inner column to outer column with each discrete density media being directed to either waste or a collection container, such as a test tube. The separated mixture in the collection container can then be further analysed, for example under a microscope or other instrument.

In yet another embodiment, the flow centrifuge also acts as a mixer in which the bowl can be modified to have small mixer/agitator vanes or baffles at the base of the bowl to provide for complete low speed alternate rotation for mixing of the introduced multiphase mixture, prior to centrifugal partition of the aqueous phases. For example, during automated, continuous operation of the centrifugal separator, the buffer solutions and buffers containing plant material disrupted to release the nuclei from cells, phase buffers or other appropriate solutions or additives may be added to the bowl and the phase buffer and other ingredients gently mixed together by the impeller action of the mixing vanes or agitator at low speed. An increase in the speed of rotation in the bowl mode causes the solutions and materials to migrate along the walls of the bowl under the influence of the applied centrifugal field until the solutions accumulate at the radial extremity of the bowl.

In an alternative to mixing vanes, the collection assembly moves into the bulk of the mixture to provide for a turbulent mixing action to solutions added to the bowl. For example, during automated, continuous operation of the centrifugal separator, the buffer solutions and buffers containing plant material, phase buffers or other appropriate solutions or additives may be added to the bowl and the phase buffer and other ingredients gently mixed together by the turbulent action caused by the insertion of the collection assembly into the mixture. The withdrawal of the collection arm and an increase in the speed of rotation in the centrifuge mode causes the solutions and materials to form annular columns of the separated discrete density phases.

In one application of the present invention, a tissue sample, for example plant tissue, would normally undergo milling to release cell nuclei prior to separation in the centrifugal separator. The milling can be conducted in a separate machine or as part of an automated tissue milling apparatus in combination with the centrifugal separator. Preferably, the tissue has been milled under low shear conditions to maintain the integrity of the DNA. Centrifugation can provide for more rapid isolation of nuclei from discrete samples of homogenates containing cellular material. The above method may function for batch processing of discrete tissue samples in a continuous process cycle.

Examples of the use of embodiments of the centrifugal separator and methods for centrifugal separation will now be described by way of example only.

Example 1

A mixture containing three phases in which one of the phases is required to be separated from the other two so that it can be further processed and analysed. The mixture containing the three phases is introduced into the bowl of the centrifugal separator. The rotation of the bowl at a high speed separates the three phases into annular columns, with the highest density phase at the outer of the bowl and the phase with the least density forming the inner column. The phase which is to undergo further processing is situated between the other two phases.

As the inner most phase is to be discarded, with the bowl still rotating, the collection assembly moves the end of the waste collection conduit towards the inner edge of the inner most column, without disturbing the other columns. As the pump connected to the waste collection conduit draws the fluid of the inner column through the conduit, the collection assembly moves outwards so that the entire inner column can be collected.

When it is detected that the entire inner column has been collected and sent to be discarded, the collection assembly moves so that the collection conduit is able to remove the middle column, which is now the inner most column of the remaining two columns. The collection of the column is similar to that of the first column, particularly the non disturbance of the outer most column, with the exception that the collected phase is directed to a container or analysis machine for further processing.

Once the entire column is collected, the collection assembly is moved so that the waste collection conduit is able to collect the outer columns and discard the column.

The process can then be repeated for another sample of different proportions or phases directly or after cleaning of the bowl.

Example 2

Embodiments of the present invention are particularly suitable for the isolation and separation of cell nuclei from tissues of plants and other genera and species. For example animals (mammals, reptiles, birds, amphibia, fish, insects) and fungi.

In particular, a two-phase buffer solution in which plant tissue homogenate is mixed contains the polymers dextran and polyethylene glycol (PEG) as the immiscible phase forming agents with the buffer being potassium phosphate in the range pH 7.0-8.0 is introduced into the bowl of the centrifugal separator.

The bowl is then rotated so that the mixture separates into two discrete phases forming an inner annular column and an outer annular column. The particulate matter of the plant tissue forms an annular column at the boundary layer of the two columns. The aqueous two-phase system promotes the partition of free plant cell nuclei within the particulate material in the interface region. The separated mixture is scanned to identify the portion containing the free plant cell nuclei. A moving collection assembly sequentially collects the separated mixture from the bowl while the bowl is rotating. The column containing the free cell nuclei is directed to a collection container so that further analysis can be undertaken to determine the DNA of the plant sample whilst the remaining phases are disposed of.

The bowl is then washed so that the process can be repeated for other samples of various amounts and compositions.

The two-phase buffer solution described above contains agents to protect the integrity of plant cell nuclei, to protect DNA integrity by inhibiting the activity of nuclease enzymes and to inhibit oxidation processes that promote the polymerization of reactive phenolic compounds. The two-phase buffer may also include additives such as soluble polyvinylpyrrilidone (PVP), EDTA and dithiothreitol or β-mercaptoethanol and a non-ionic detergent such as Triton or Tween to facilitate the dispersal of plant cell membranes and to promote the solubilization of proteins, polysaccharides and phenolic compounds.

However, it is to be understood that the foregoing phase-forming polymer compounds are not exclusive, and that additional or alternative compounds could be included or substituted for the forgoing compounds, including such alternative aqueous phase forming systems as Ficol:Dextran, Uncon: Dextran, hydroxypropyl starch:poly(ethylene glycol) (PEG), arabinogalactan:PEG, PVP/PEG:Dextran, PVP:PEG or Salt: PEG, or some other combination of an polymer with a substituted-Dextran, or a substituted-poly(ethylene glycol) polymer with Dextran.

Example 3

Embodiments of the present invention are particularly suitable for the isolation and separation of nucleic acids such as genomic DNA and RNA from cell nuclei from tissues of plants and other genera and species. For example animals (mammals, reptiles, birds, amphibia, fish, insects), fungi and bacteria.

The multiphase mixture can also use selective partition of nucleic acid polymers into particular phase layers to partially separate the polymers from other cell particulate material and soluble polymers that selectively partition into another phase. The phase containing the nucleic acid polymer may then be collected and remixed with fresh multiphase components to further remove residual components that will partition into a different phase to phase in which the nucleic acid is partitioned.

The technique comprises mixing a sample with multiphase mixture and chaotropic ions capable of releasing nucleic acids polymers to thereby solubilize the nucleic acids free from other contaminant polymers such as proteins and polysaccharides, removing contaminants by phase partition, and collecting the nucleic acid enriched phase layer. This technique is advantageous in that it is suitable both for the extraction of DNA and for the extraction of less stable RNA, and capable of giving highly-enriched nucleic acids. The steps of separating nucleic acids and other polymers involves procedures such as centrifugation, filtration using a filter, etc., and therefore is compatible when used with the apparatus described herein.

Example 4

Embodiments of the present invention are particularly suitable for the isolation and separation of nucleic acids such as genomic DNA and RNA from cell nuclei from tissues of plants and other genera and species. For example animals (mammals, reptiles, birds, amphibia, fish, insects), fungi and bacteria.

The multiphase mixture can also use selective partition of nucleic acid polymers into particular phase layers to partially separate the polymers from other cell particulate material and soluble polymers that selectively partition into another phase. The phase containing the nucleic acid polymer may then be collected and remixed with fresh multiphase components to further remove residual components that will partition into a different phase to phase in which the nucleic acid is partitioned.

The multiphase mixture can also use paramagnetic microspheres to reversibly capture nucleic acid polymers from relatively pure aqueous solutions including selected phase layers, employing mass action affinities. Preferably nucleic acid polymers may be reversibly bound by mass action to magnetic particles with negatively charged surfaces; this surface charge aids the release of bound DNA following the removal of contaminating solutes.

The surface of the microsphere may be functionalized and active selective ligands added to the surface to provide specificity in the capture of particular biomolecules and particles, including nucleic acids. The attachment of planar aromatic compounds such as malachite green, phenyl neutral red, phenyl phenazinium dye, polyamines, ethidium, SYBR Green, Pico Green, Hoechst 42942, or Hoechst 33258 which display preferential binding for particular DNA sequences, or particular base pair regions in DNA are known. Such affinity dyes can be attached to a variety of solid matrices that act to retain and bind nucleic acid to a solid surface.

The multiphase mixture can also use a wide variety of microparticle supports instead of microspheres including microparticles made of controlled pore glass (CPG), acrylic copolymers, PEG particles, cellulose, nylon, dextran, highly cross-linked polystyrene, polyacrolein and the like.

Alternatively, non-specific nucleic acid-binding techniques which include the use of detergents, and by the use of chaotropes and a nucleic acid-binding solid phase such as silica particles can be used instead of the binders, microspheres or microparticle supports.

The technique comprises mixing a sample with nucleic acid-binding silica particles and chaotropic ions capable of releasing nucleic acids to thereby bind the nucleic acids to silica particles, removing contaminants by washing, and collecting the nucleic acids bound to the silica particles. This technique is advantageous in that it is suitable both for the extraction of DNA and for the extraction of less stable RNA, and capable of giving high-purity nucleic acids. The steps of washing the particles having bound nucleic acids involves procedures such as centrifugation, filtration using a filter, etc., and therefore is compatible when used with the flow centrifugation apparatus described herein. However, it is to be understood that the foregoing acrylamide-based affinity particles and DNA-binding silica matrix particles and magnetic particles are not exclusive, and that additional or alternative compounds could be included or substituted for the foregoing compounds.

Example 5

The selective purification of nucleic acid molecules can also be attained by using the apparatus and method described previously. The selective constituent may be any suitable medium which may select the molecule of interest by any suitable means. For example, the selection may be based on attracting and selectively binding the molecule of interest, such as in affinity matrices.

The selective constituent may also include also employ a particulate bed or affinity matrix resins in which an affinity-dye may direct the binding. For example, ethidium, Hoechst 42942 or SYBR green may be utilised via primary amine or quaternary amine functions respectively to the hydroxyl groups on the surface of a polyacrylamide particle, or sepharose particles, or sulfonyl chloride resin, surface activated nylon, or the surface of fine silica dioxide particles, or onto paramagnetic particles possessing a surface coating of silica, polyacrylamide or using an aldehyde linker moiety. However, it is to be understood that the foregoing acrylamide-based affinity resins and DNA-binding silica matrices are not exclusive, and that additional or alternative compounds could be included or substituted for the foregoing compounds.

The claims defining the invention are as follows:

1. An apparatus for separating a multiphase mixture, separable into discrete density phases, the apparatus including:
    a circular bowl rotatable about a central axis and having an opening through which the mixture is introduced into the bowl, whereby the rotation of the bowl separates the mixture to form annular columns of the discrete density phases,
    a delivery conduit inserted into the bowl through the opening for introducing the mixture into the bowl, and
    a collection assembly for removing the separated discrete density phases, the collection assembly comprising a collection conduit for collecting the annular columns, a waste collecting conduit, and a cleaning conduit,
    wherein the collection assembly is movable as a single unit with respect to the bowl such that the collection assembly can be positioned within the bowl to sequentially, selectively and individually remove the annular columns from the bowl while the bowl is rotating substantially without disturbing the remaining annular columns within the bowl.

2. An apparatus according to claim 1, wherein the collection assembly is positioned proximal to a surface of the annular column closest to the central axis during removal of the annular column.

3. An apparatus according to claim 1, wherein the collection assembly further comprises a pump connected to the collection conduit and/or the waste collecting conduit.

4. An apparatus according to claim 1, wherein the collection conduit is arranged such that the proximal end of the collection conduit extends substantially perpendicular to the central axis of the bowl.

5. An apparatus according to claim 1, wherein the bowl further includes a means for agitating and mixing components of the multiphase mixture in the bowl to form a mixture.

6. An apparatus according to claim 5, wherein the means for agitating and mixing the mixture is baffles positioned in the bowl.

7. An apparatus according to claim 1, wherein the collecting assembly further includes a means for identifying the discrete density media or boundary layers formed thereby and a means to control the movement of the collection assembly to allow for the sequential removal from the bowl of each discrete density media by either the collecting conduit or the waste collecting conduit.

8. An apparatus according to claim 7, wherein the means for identifying the discrete density media is selected from optical, spectral, electrical conductivity or rheostatic analysis of the discrete density media.

9. A method of separating a multiphase mixture separable into discrete density phases, including the steps of:
   introducing the mixture via a delivery conduit into a circular bowl, the bowl having an opening through which the delivery conduit is inserted and a central axis of rotation,
   rotating the bowl about the central axis of the bowl such that the mixture is separated into annular columns formed by the discrete density phases, and
   removing the discrete density phases from the bowl by a collection assembly comprising a collection conduit for collecting the annular columns, a waste collecting conduit, and a cleaning conduit,
   wherein the collection assembly is movable as a single unit with respect to the bowl such that the collection assembly can be positioned within the bowl to sequentially, selectively and individually remove the annular columns from the bowl while the bowl is rotating substantially without disturbing the remaining annular columns within the bowl.

10. A method according to claim 9, wherein the collection assembly is positioned proximal to a surface of the annular column closest to the central axis during removal of the annular column.

11. A method according to claim 9, wherein the flow rate of collection from the surface of the annular column is at least equal to the flow rate at which an equivalent volume within the annular column is presented for collection.

12. A method according to claim 9, wherein the method further includes the step of cleaning the bowl after removal of the discrete density phases from the bowl.

13. A method according to claim 9, wherein the steps of introducing a multiphase mixture, rotating the bowl and removing the discrete density media are repeated for at least one other multiphase mixture whilst the bowl is rotating.

14. A method according to claim 9, wherein the step of introducing the multiphase mixture into the bowl is achieved by introducing separate components of the multiphase mixture separately into the bowl and agitating and mixing the separate components in the bowl to form the multiphase mixture.

15. A method according to claim 14, wherein the agitating and mixing of the multiphase mixture is achieved by baffles positioned in the bowl.

16. A method according to claim 9, wherein the method further includes the step of identifying the discrete density phases or boundary layers formed thereby, and controlling the movement of the collection assembly such that each of the discrete density phases is removed from the bowl by either the collection conduit or the waste collection conduit.

17. A method according to claim 16, wherein the step of identifying the discrete density phases or boundary layers is performed using a means of detection selected from optical, spectral, electrical conductivity or rheostatic analysis of the discrete density phases in the bowl.

18. A method according to claim 9, whereby nuclei of cellular material within the multiphase mixture are partitioned at a boundary layer of the discrete density phases.

19. A method according to claim 9, whereby nucleic acids of cellular material within the multiphase mixture are partitioned in a discrete density phase.

20. A method according to claim 9, whereby nucleic acids of cellular material within the multiphase mixture that are bound to a particle are partitioned at a boundary layer of the discrete density phases.

* * * * *